US010863491B2

(12) United States Patent
Peng et al.

(10) Patent No.: US 10,863,491 B2
(45) Date of Patent: Dec. 8, 2020

(54) BASE STATION APPARATUS, CONTROL METHOD, AND STORAGE MEDIUM

(71) Applicant: KDDI CORPORATION, Tokyo (JP)

(72) Inventors: Hailan Peng, Fujimino (JP); Toshiaki Yamamoto, Fujimino (JP); Xiaoqiu Wang, Fujimino (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 16/513,569

(22) Filed: Jul. 16, 2019

(65) Prior Publication Data

US 2019/0342881 A1    Nov. 7, 2019

Related U.S. Application Data

(63) Continuation of application No. 15/341,560, filed on Nov. 2, 2016, now Pat. No. 10,405,302, which is a (Continued)

(30) Foreign Application Priority Data

May 7, 2014  (JP) .................................. 2014-096197

(51) Int. Cl.
  *H04W 72/04*     (2009.01)
  *H04W 76/15*     (2018.01)
  (Continued)

(52) U.S. Cl.
  CPC .......... *H04W 72/0413* (2013.01); *H04J 1/00* (2013.01); *H04L 5/006* (2013.01); *H04L 5/0053* (2013.01);
  (Continued)

(58) Field of Classification Search
  None
  See application file for complete search history.

(56) References Cited

U.S. PATENT DOCUMENTS 9,749,998 B2    8/2017  Takeda et al.
9,936,515 B2    4/2018  Fujishiro et al.
                (Continued)

FOREIGN PATENT DOCUMENTS

JP     2014-33314 A      2/2014
WO    2010/103728 A1     9/2010
                (Continued)

OTHER PUBLICATIONS

JPO; Application No. 2018-127551; Office Action dated Mar. 18, 2019.

(Continued)

*Primary Examiner* — Saba Tsegaye
(74) *Attorney, Agent, or Firm* — Fitch, Even, Tabin & Flannery LLP

(57) ABSTRACT

In a wireless communication system in which when connecting one terminal apparatus to a base station apparatus and another base station apparatus, the other base station apparatus selects a frequency band to be used for control channels transmitted from the terminal apparatus to the other base station apparatus from a plurality of frequency bands usable by the other base station apparatus, and notifies the terminal apparatus of the selected frequency band, the base station apparatus acquires from the terminal apparatus information about radio quality of a signal received from the other base station apparatus for at least one frequency band out of the plurality of frequency bands, extracts a portion of frequency bands out of the plurality of frequency bands based on the acquired information about radio quality, and notifies the other base station apparatus of information representing the portion of frequency bands.

6 Claims, 4 Drawing Sheets

Related U.S. Application Data continuation of application No. PCT/JP2015/002322, filed on May 7, 2015.

(51) Int. Cl.
- H04W 72/08 (2009.01)
- H04J 1/00 (2006.01)
- H04L 5/00 (2006.01)
- H04W 92/20 (2009.01)

(52) U.S. Cl.
CPC ........... *H04L 5/0091* (2013.01); *H04W 72/04* (2013.01); *H04W 72/0426* (2013.01); *H04W 72/0453* (2013.01); *H04W 72/085* (2013.01); *H04W 76/15* (2018.02); *H04W 92/20* (2013.01)

(56) References Cited

U.S. PATENT DOCUMENTS

| | | | |
|---|---|---|---|
| 2012/0008614 A1 | 1/2012 | Hirakawa et al. | |
| 2013/0195078 A1 | 8/2013 | Kobayashi et al. | |
| 2015/0156695 A1 | 6/2015 | Zhang et al. | |
| 2015/0173009 A1 | 6/2015 | Vallath et al. | |
| 2015/0271713 A1* | 9/2015 | Kim | H04W 72/04 455/437 |
| 2015/0350896 A1 | 12/2015 | Jeong et al. | |
| 2016/0219604 A1 | 7/2016 | Fujishiro et al. | |
| 2016/0285569 A1 | 9/2016 | Nagata et al. | |
| 2016/0338039 A1* | 11/2016 | Van Der Velde | H04L 5/001 |

FOREIGN PATENT DOCUMENTS

| | | |
|---|---|---|
| WO | 2014/021210 A1 | 2/2014 |
| WO | 2015115573 A1 | 8/2015 |

OTHER PUBLICATIONS

Report on [85#21][LTE/DC) Basic signalling flows (Samsung), Samsung, 3GPP TSG-RAN WG2#85bis, R2-141465, Mar. 22, 2014, pp. 2-35.

Dual Connectivity, framework for SCG cell management, including measurement support, Samsung, 3GPP TSG-RAN WG2#85bis, R2-141516, Mar. 21, 2014, pp. 2-5.

SIPO; Application No. 201580023938.8; Office Action dated Apr. 2, 2019.

European Search Report dated Mar. 28, 2017 for European Patent Application No. 15789706.7. (8 pages).

LG Electronics; "Physical layer impact of dual connectivity"; Feb. 9, 2014; XP050735868.

NTT Docomo et al; "Introduction of Dual Connectivity"; Apr. 14, 2014; XP050818069.

3GPP TR 36. 842 v12. 0. 0 3rd Generation Partnership Project; Technical Specification Group Radio Access Network; Study on Small Cell enhancements for E-UTRA and E-UTRAN; Higher layer aspects (Release 12).

Ericsson, Adding and releasing DRBs and SCells for SeNB, 3GPP TSG-RAN WG2#85bis R2-141531, Apr. 4, 2014, p. 2, <URL:http://www.3gpp.org/ftp/tsg_ran/WG2_RL2/TSGR2_85bis/Docs/R2-141531.zip>.

Samsung, Report on [85b#15] [L TE/DC] SCG RRM (Samsung), 3GPP TSG-RAN WG2#86 R2-142722, May 14, 2014, p. 2,3, <URL:http://www.3gpp.org/ftp/tsg_ran/WG2 RL2/TSGR2_86/Docs/R2-142722.zip>.

International Search Report dated Jun. 23, 2015 for PCT/JP2015/002322 and English translation of the same. (4 pages).

JPO; Application No. 2019-164756; Office Action dated Sep. 11, 2020.

\* cited by examiner

BASE STATION APPARATUS, CONTROL METHOD, AND STORAGE MEDIUM

CROSS-REFERENCE TO RELATED APPLICATIONS

This application is a continuation of U.S. application Ser. No. 15/341,560 filed Nov. 2, 2016, now U.S. Pat. No. 10,405,302, and is a continuation of International Patent Application No. PCT/JP2015/002322 filed on May 7, 2015, and claims priority to Japanese Patent Application No. 2014-096197 filed on May 7, 2014, the entire content of all of which are incorporated herein by reference.

TECHNICAL FIELD

The present invention relates to a base station apparatus, a control method, and a storage medium and, more particularly, to a wireless communication system including a plurality of base station apparatuses and a terminal that communicates with the plurality of base station apparatuses.

BACKGROUND ART

In the third generation partnership project (3GPP), there is a debate about installing, in the coverage of a large cell (macro cell), a number of small cells using a different frequency band (for example, a frequency band higher than that used in the macro cell). For example, as in the example of FIG. 1, a plurality of small cells that use a frequency band of 3.5 GHz are placed in the coverage area of a macro cell that uses a frequency band of 2 GHz.

In LTE Release 12, discussions have started concerning a technology called Dual Connectivity that makes two types of base stations cooperate under such an environment (NPL 1). The two types of base stations are a master eNodeB (a mater eNB, for example, the base station of a macro cell) and a secondary eNodeB (a secondary eNB, for example, the base station of a small cell). In the Dual Connectivity, the two types of base stations are connected via a wired or wireless backhaul channel. Note that a terminal apparatus can establish connection to both the master eNB and the secondary eNB and, for example, receive data from the two base station apparatuses.

In the Dual Connectivity, downlink signaling of a control signal to the terminal apparatus is done by the master eNB (NPL 1). On the other hand, in uplink, a control signal from the terminal is assumed to be transmitted not only to the master eNB but also to the secondary eNB. The master eNB and the secondary eNB can use a plurality of frequency bands each having a predetermined bandwidth. The terminal apparatus transmits the control signal in at least one of the plurality of frequency bands. Note that each of the plurality of frequency bands corresponds to, for example, the component carrier of a 20-MHz bandwidth. Note that each of the plurality of frequency bands that the master eNB and the secondary eNB can use is assigned, for example, a different unit for a baseband, and a different cell (communicable range) is formed in each of the plurality of frequency bands. That is, each of the master eNB and the secondary eNB is one base station apparatus but forms a plurality of cells in correspondence with a plurality of frequency bands. The set of the plurality of cells for the master eNB is called an MCG (Master Cell Group), and the set of the plurality of cells for the secondary eNB is called an SCG (Secondary Cell Group).

CITATION LIST

Non Patent Literature

NPL 1: 3GPP TR 36.842 v12.0.0

SUMMARY OF INVENTION

Technical Problem

The terminal apparatus needs to transmit a control channel (PUCCH: Physical Uplink Control Channel) to the master eNB and the secondary eNB in one cell of the MCG and one cell in the SCG. To do this, the master eNB and the secondary eNB each need to determine a cell in which the terminal apparatus needs to transmit the control channel and notify the terminal apparatus of the cell.

Regarding this, a meeting of 3GPP has reached a consensus that one cell out of a plurality of cells included in an SCG in which a PUCCH should be transmitted for a certain terminal apparatus should be determined by the secondary eNB. There is also a consensus that the secondary eNB can obtain assistance from the master eNB at this time. However, no detailed method has been established about how the secondary eNB selects the above-described one cell and what kind of assistance should be obtained from the master eNB.

The present invention has been made in consideration of the above-described problem, and provides a method to be used when a secondary eNB determines one cell to be used to transmit a PUCCH in Dual Connectivity.

Solution to Problem

According to an aspect of the present invention, there is provided a base station apparatus in a wireless communication system in which when connecting one terminal apparatus to the base station apparatus and another base station apparatus, the other base station apparatus selects a frequency band to be used for a control channel being transmitted from the terminal apparatus to the other base station apparatus from a plurality of frequency bands usable by the other base station apparatus, and notifies the terminal apparatus of the selected frequency band, comprising an acquisition unit configured to acquire, from the terminal apparatus, information about radio quality of a signal received from the other base station apparatus for at least one frequency band out of the plurality of frequency bands, an extraction unit configured to extract a portion of frequency bands out of the plurality of frequency bands based on the acquired information about the radio quality, and a notification unit configured to notify the other base station apparatus of information representing the portion of frequency bands.

According to another aspect of the present invention, there is provided a base station apparatus in a wireless communication system in which when connecting one terminal apparatus to the base station apparatus and another base station apparatus, the other base station apparatus selects a frequency band to be used for a control channel being transmitted from the terminal apparatus to the other base station apparatus from a plurality of frequency bands usable by the other base station apparatus, and notifies the terminal apparatus of the selected frequency band, comprising an acquisition unit configured to acquire, from the terminal apparatus, information about radio quality of a signal received from the other base station apparatus for at least one frequency band out of the plurality of frequency bands, and a notification unit configured to notify the other base station apparatus of the acquired information about the radio quality for each of the at least one frequency band.

Advantageous Effects of Invention

According to the present invention, there is provided a method to be used when a secondary eNB determines one cell to be used to transmit a PUCCH in Dual Connectivity.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

An embodiment of the present invention will now be described in detail with reference to the accompanying drawings.

(System Arrangement)

Figure 1:
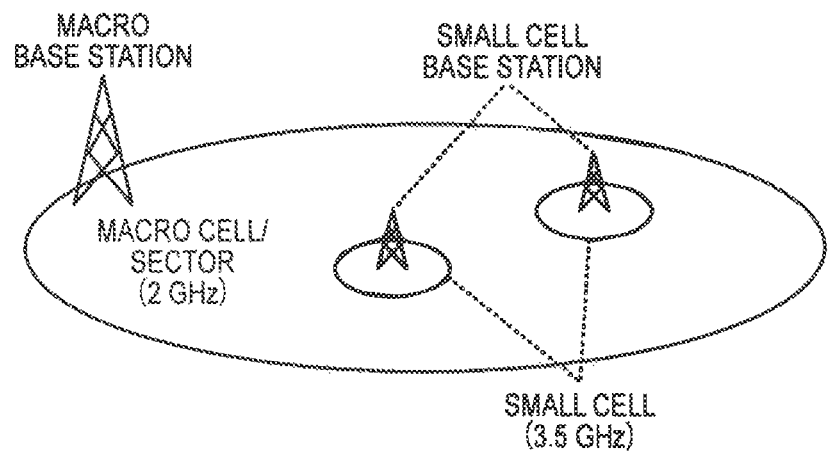
FIG. 1 is a conceptual view showing an example of the arrangement of a macro cell and small cells, which use different frequency bands.
Figure 2:
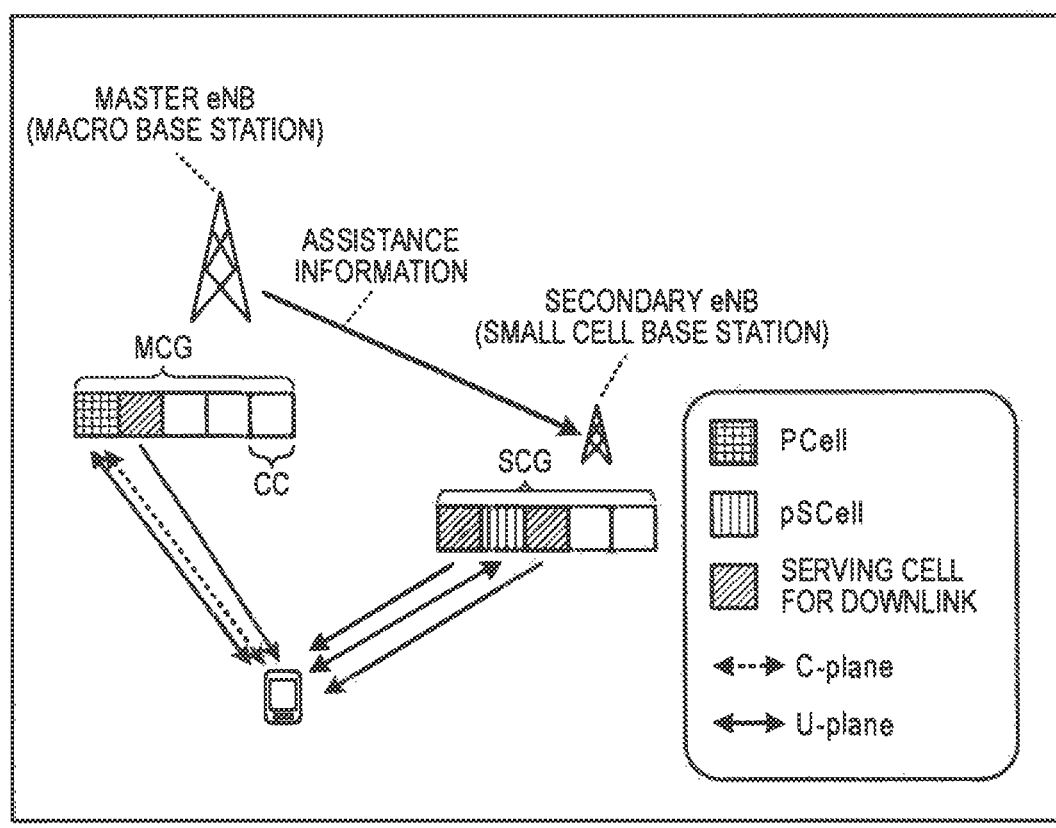
FIG. 2 is a conceptual view showing an example of communication between a terminal and a plurality of eNBs by Dual Connectivity.

For example, as shown in FIG. 2, a wireless communication system according to this embodiment includes a master eNB, a secondary eNB, and a terminal apparatus (UE). Note that although the eNB is a base station apparatus (eNodeB) here, the compatible wireless communication system may be any system other than LTE. The terminal apparatus is a mobile or fixed wireless communication apparatus and may be compatible with a wireless communication system other than LTE. Note that in the wireless communication system according to this embodiment, the master eNB performs communication using a first frequency band (for example, 2 GHz), and the secondary eNB performs communication using a second frequency band (3.5 GHz). The master eNB and the secondary eNB may be able to use the same frequency band. That is, the first frequency band and the second frequency band may be the same frequency band. Note that even if the first frequency band and the second frequency band are different frequency bands, they can exist as portion of frequency bands in the same frequency band of, for example, 2 GHz.

The master eNB and the secondary eNB can each perform communication using a plurality of component carriers (CCs) in the frequency band used. Each of the plurality of CCs corresponds to a frequency band having a predetermined width of, for example, 20 MHz. The master eNB and the secondary eNB each form a plurality of cells capable of communication in correspondence with the plurality of CCs, as described above. Since one cell corresponds to one CC, the term "cell" will be used below with the meaning of a corresponding CC (frequency band). Note that in the following discussion, the frequency band corresponding to each cell need not always correspond to one CC and may correspond to a frequency band having a predetermined bandwidth defined in the wireless communication system.

As described above, the set of cells formed by the master eNB is called an MCG (Master Cell Group), and the set of cells formed by the secondary eNB is called an SCG (Secondary Cell Group). FIG. 2 shows a state in which each of the MCG and the SCG includes five cells. Note that the number of cells is determined based on, for example, the frequency bandwidths usable by the master eNB and the secondary eNB and the frequency bandwidth of one CC. Communication is performed between the terminal and the master eNB using at least one cell out of the MCG. Similarly, in a state in which the Dual Connectivity is established, communication is performed between the terminal and the secondary eNB using at least one cell out of the SCG.

In the Dual Connectivity, communication in a C-plane (control plane), for example, transmission of an RRC (Radio Resource Control) message to be transmitted to the terminal is performed by the master eNB but not by the secondary eNB. A cell in which communication between the terminal and the master eNB is performed in the control plane is called a PCell. In the PCell, communication in a U-plane (user plane) can also be performed as well as the communication in the control plane. The PCell is set for each terminal. For example, the terminal is guaranteed to be able to transmit uplink data to the master eNB in the PCell set for itself. Note that the terminal can also transmit uplink data in another cell. However, for example, the terminal does not transmit data in another cell without transmitting data in the set PCell. In addition, the terminal needs to transmit a PUCCH (Physical Uplink Control Channel) in the PCell. For at least one of the cells included in the MCG and the cells included in the SCG, the terminal can measure the radio quality of a radio signal transmitted from the master eNB or the secondary eNB and notify the measurement result to the master eNB in the PCell. Note that the radio quality can be, for example, reference signal reception power (RSRP) or reference signal reception quality (RSRQ). However, another radio quality (for example, SIR or SNR) may be used as the radio quality. Note that the terminal may notify the master eNB of the measurement result when a predetermined condition is met, for example, when a radio signal from a cell of the SCG is received at a predetermined power or more. Alternatively, for example, the terminal may periodically notify the master eNB of the measurement result. The MCG also includes, for example, a serving cell for downlink to the terminal. The master eNB can transmit data to the terminal in the serving cell for downlink.

On the other hand, in the SCG, a cell to be used to transmit an RRC message is not set, unlike the PCell. Instead, a cell on which a PUCCH should be transmitted by a terminal is set for each terminal. This cell will be referred to as a primary SCell (pSCell) here. Note that the terminal can transmit the PUCCH even in a cell other than the pSCell. However, the terminal need not transmit the PUCCH in a cell other than the pSCell but needs to transmit the PUCCH in the pSCell. The SCG also includes, for example, a serving cell for downlink, like the MCG. Data can be transmitted to the terminal in the serving cell for downlink. In the MCG and the SCG, not all the cells need be used for communication with the terminal. For example, as indicated by hollow squares in FIG. 2, there also exist cells that correspond to none of the PCell, the pSCell, and the serving cell for downlink. The master eNB and the secondary eNB, for example, do not perform communication with the terminal in these cells.

(Outline)

The PCell and the pSCell are selected from the MCG and the SCG and set for each terminal, as described above. The setting information is notified to the terminal by an RRC message via, for example, the master eNB. As described above, the 3GPP has reached a consensus that the secondary eNB selects the pSCell from the SCG. At this time, the secondary eNB may make the selection using assistance information notified by the master eNB. However, a detailed method of the selection, what kind of information should be used as the assistance information, and the like are still undetermined at the present time.

Hence, a detailed method of selecting the pSCell by the secondary eNB under the assistance of the master eNB will be proposed below.

(Arrangement of Master eNB and Secondary eNB)

Figure 3:
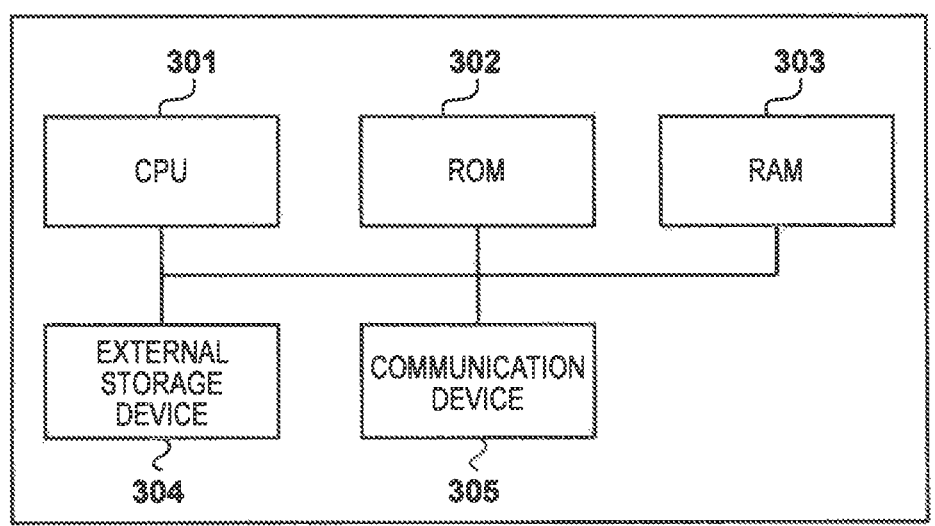
FIG. 3 is a block diagram showing an example of the hardware arrangement of a master eNB and a secondary eNB.

FIG. 3 shows an example of the hardware arrangement of the master eNB and the secondary eNB (base station apparatus) according to this embodiment. The master eNB and the secondary eNB each include, for example, a CPU 301, a ROM 302, a RAM 303, an external storage device 304, and a communication device 305. In each of the master eNB and the secondary eNB, the CPU 301 executes a program that is recorded in, for example, one of the ROM 302, the RAM 303, and the external storage device 304 and implements each function of the master eNB or the secondary eNB to be described below.

In each of the master eNB and the secondary eNB, for example, the CPU 301 controls the communication device 305 to perform communication between the terminal and the master eNB or the secondary eNB or inter-eNB communication between the master eNB and the secondary eNB. Note that the master eNB and the secondary eNB may each include dedicated hardware configured to execute each function. Alternatively, some functions may be executed by hardware, and the remaining portions may be executed by a computer on which a program is operated. All functions may be executed by a computer and a program.

Note that in FIG. 3, the master eNB and the secondary eNB each include one communication device 305. In fact, a plurality of communication devices 305 may be provided, or the communication device 305 may include a plurality of communication devices. That is, for example, the master eNB and the secondary eNB may each include a communication device for communication between the eNBs and a communication device for communication with the terminal.

The master eNB and the secondary eNB may each prepare the communication device for communication with the terminal for each CC. Note that the communication device 305 may include a plurality of units for baseband processing and may be configured to transmit, via one antenna, signals generated by the units for the plurality of CCs. In this case, for example, identification information (global ID) for uniquely identifying a unit is assigned, thereby specifying one CC for one eNB by the global ID becomes possible. Note that a cell ID may be assigned for each frequency band (CC). In this case, two pieces of identification information including the cell ID and an ID for specifying an eNB are specified, thereby specifying one CC for one eNB.

Figure 4:
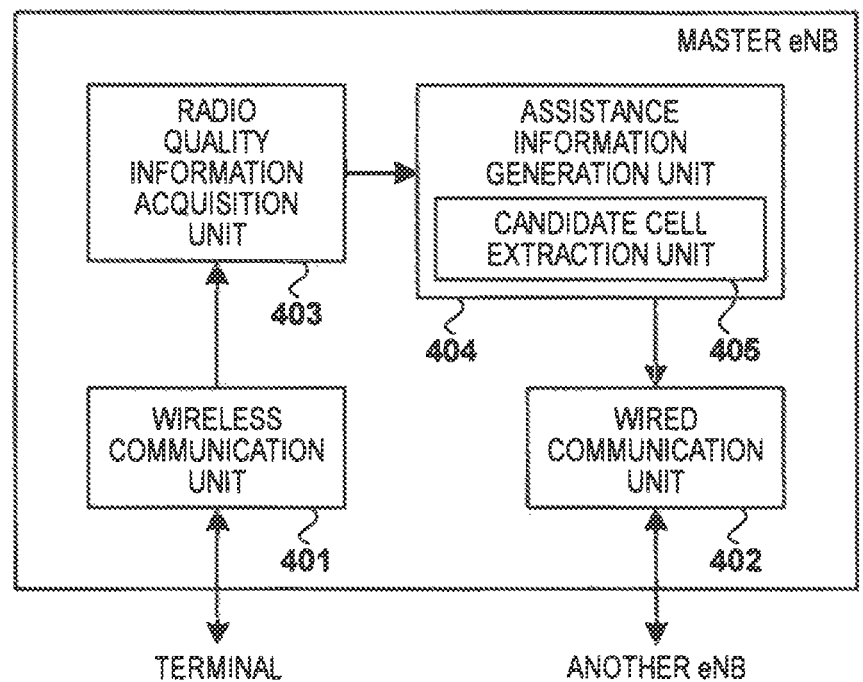
FIG. 4 is a block diagram showing an example of the functional arrangement of a master eNB.

The functional arrangement of the master eNB will be described next. FIG. 4 is a block diagram showing an example of the functional arrangement of the master eNB according to this embodiment. The master eNB includes, for example, a wireless communication unit 401, a wired communication unit 402, a radio quality information acquisition unit 403, and an assistance information generation unit 404.

The wireless communication unit 401 is a functional unit configured to perform wireless communication. The wireless communication unit 401 establishes wireless connection to, for example, the terminal and performs wireless communication. That is, the wireless communication unit 401 establishes connection to the terminal in one or more cells out of the plurality of cells included in the MCG. The wireless communication unit 401 selects, for example, one cell as a PCell out of one or more cells for which the connection is established and notifies the terminal of it by an RRC message. According to the RRC message, the terminal recognizes the PCell in which a PUCCH needs to be transmitted. The wireless communication unit 401 receives the PUCCH from the terminal in the PCell. The wireless communication unit 401 also transmits data to the terminal in the PCell or in, for example, the serving cell for downlink. In addition, the wireless communication unit 401 receives data from the terminal in the PCell or in another cell in addition to the PCell. The wireless communication unit 401 can also receive a measurement report including information of, for example, reference signal reception power (RSRP) or reference signal reception quality (RSRQ) from the terminal. The received measurement report is input to the radio quality information acquisition unit 403.

The wired communication unit 402 is a functional unit configured to perform wired communication. The wired communication unit 402 establishes wired connection to, for example, the secondary eNB and performs wired communication. The wired communication unit 402, for example, notifies the secondary eNB of assistance information generated by the assistance information generation unit 404 (to be described later) and used when the secondary eNB selects the pSCell. Note that the master eNB and the secondary eNB may be connected not by a wire but by, for example, a fixed radio channel. In this case, the wired communication unit 402 may be absent. If a radio section exists halfway through the connection between the master eNB and the secondary eNB, the wired communication unit 402 may exist to establish wired connection to the endpoint of the halfway radio section.

The radio quality information acquisition unit 403 acquires information, received by the wireless communication unit 401, about the radio quality of a radio signal received by the terminal for one or more cells included in a plurality of cells included in the SCG. That is, the radio quality information acquisition unit 403 acquires, for example, the information of RSRP or RSRQ as the radio quality information at the terminal. Note that the radio quality information is acquired for each terminal. The acquired radio quality information is input to the assistance information generation unit 404.

The assistance information generation unit 404 generates assistance information based on the radio quality information. The generated assistance information is transmitted to the secondary eNB via the wired communication unit 402. For example, for cells for which radio quality information from a certain terminal is acquired, the assistance information generation unit 404 generates assistance information including radio quality information for each cell. In this case, to explicitly show on which cell the radio quality is obtained and what kind of radio quality is obtained for the cell, the identification information of a cell and radio quality information are associated and included in the assistance information. Note that the assistance information is individually generated for, for example, each of a plurality of terminals. Note that the assistance information generation unit 404 may generate a signal by integrating pieces of assistance information corresponding to the plurality of terminals and transmit the signal to the secondary eNB via the wired communication unit 402.

The assistance information generation unit 404 may further include, for example, a candidate cell extraction unit 405 that extracts a portion of cells out of the plurality of cells included in the SCG as candidate cells to be selected as the pSCell by the secondary eNB based on the radio quality information.

The candidate cell extraction unit 405, for example, extracts a predetermined number of cells as the above-described portion of cells in descending order of radio quality out of the plurality of cells included in the SCG based on the radio quality information. The candidate cell extraction unit 405 may, for example, extract cells for which the radio quality exceeds a predetermined value as the above-described portion of cells out of the plurality of cells included in the SCG based on the radio quality information. At this time, if the number of cells for which the radio quality exceeds a predetermined value exceeds a predetermined number, the candidate cell extraction unit 405 may selectively extract a predetermined number of cells. At this time, for example, the candidate cell extraction unit 405 may selectively extract a predetermined number of cells at random from cells for which the radio quality exceeds a predetermined value or selectively extract a predetermined number of cells in descending order of radio quality.

The assistance information generation unit 404 generates assistance information including information for specifying the extracted portion of cells. The information for specifying a cell is, for example, identification information for identifying each cell in the secondary eNB. In this case, the identification information of one cell is transmitted to the secondary eNB, thereby specifying the one cell in the secondary eNB becomes possible based on the combination of the destination and the identification information. Likewise, the information for specifying a cell may include the identification information of the secondary eNB and the identification information of the cell. One cell in one secondary eNB can uniquely be specified based on the combination of the identification information of the secondary eNB and the identification information of the cell. Alternatively, different IDs may be assigned to cells in each eNB. If there exists identification information capable of uniquely specifying an arbitrary cell in an arbitrary eNB, the identification information may be used as the information for specifying the cell. For example, a unit for baseband processing for each cell is assigned a global ID for uniquely specifying the unit. Hence, the global ID can be used as the information for specifying a cell.

The assistance information generation unit 404 may include information for specifying an extracted portion of cells in assistance information in an order according to the level of radio quality. For example, a case in which out of five cells, the first cell, the second cell, and the fourth cell are extracted as the above-described portion of cells, and the radio quality lowers in the order of the fourth cell, the first cell, and the second cell will be explained. In this case, the assistance information generation unit 404 includes information for specifying the cells in assistance information in the order of, for example, "4", "1", and "2". Upon receiving the information, the secondary eNB can grasp that the fourth cell has the highest radio quality, and subsequently, the radio quality lowers in the order of the first cell and the second cell. Hence, for example, since the fourth cell can be considered as the cell with the highest PUCCH reception quality, the secondary eNB can select the fourth cell as the cell to which the terminal needs to transmit the PUCCH. Note that the assistance information generation unit 404 may include the information for specifying the cells in assistance information in the order of, for example, "2", "1", and "4". In this case as well, upon receiving the information, the secondary eNB can grasp that the fourth cell has the highest radio quality, and subsequently, the radio quality lowers in the order of the first cell and the second cell.

Note that the assistance information generation unit 404 may generate assistance information by adding the information of an order concerning the level of radio quality for an extracted cell. For example, in the above-described case, the assistance information generation unit 404 may generate assistance information by adding information "2" for the first cell, "3" for the second cell, and "1" for the fourth cell. The assistance information may further include, for example, a field to include the information of the level of radio quality for each cell. The assistance information generation unit 404 may generate assistance information by storing the numerical value of a level in a field. That is, the assistance information generation unit 404 may generate assistance information by storing, for example, "2" in a field for the first cell, "3" in a field for the second cell, and "1" in a field for the fourth cell. Note that, for example, for a cell of a level lower than a predetermined level, the assistance information generation unit 404 may store "0" in the field for the cell.

The assistance information generation unit 404 may generate assistance information by including the information of radio qualities for an extracted portion of cells. That is, for example, in a case in which out of five cells, the first cell, the second cell, and the fourth cell are extracted as the above-described portion of cells, for example, assistance information is generated by including the values of RSRP or RSRQ for these cells. Note that a value other than RSRP or RSRQ may be used as radio quality. In this case, since the level of radio quality becomes clear based on the radio quality information, the information of the above-described level need not be included. However, the information may be included. This is because the master eNB may have no idea about how the secondary eNB uses the assistance information.

Figure 5:
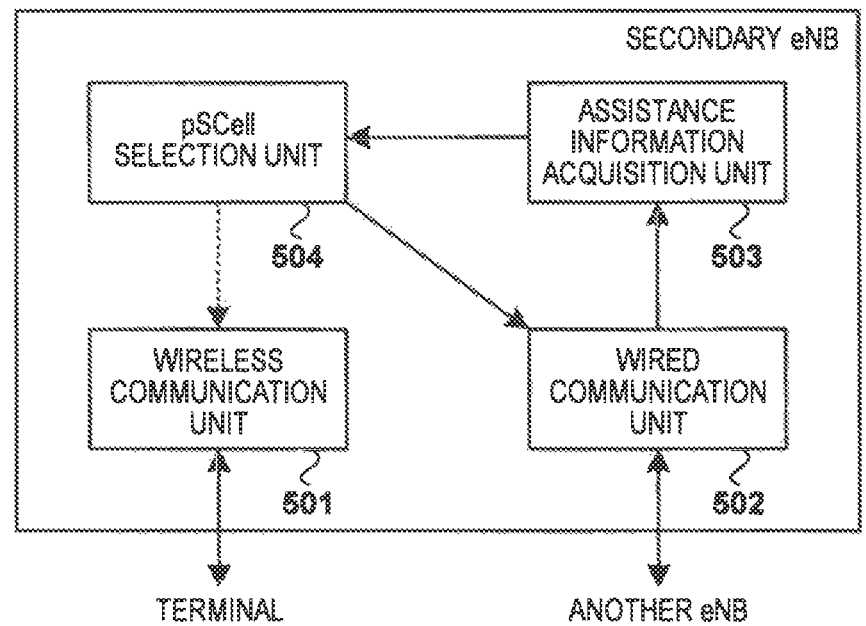
FIG. 5 is a block diagram showing an example of the functional arrangement of a secondary eNB.

The functional arrangement of the secondary eNB will be described next. FIG. 5 is a block diagram showing an example of the functional arrangement of the secondary eNB according to this embodiment. The secondary eNB includes, for example, a wireless communication unit 501, a wired communication unit 502, an assistance information acquisition unit 503, and a pSCell selection unit 504.

The wireless communication unit 501 is a functional unit configured to perform wireless communication. The wireless communication unit 501 establishes wireless connection to, for example, the terminal and performs wireless communication. That is, the wireless communication unit 501 establishes connection to the terminal in one or more cells out of the plurality of cells included in the SCG. The wireless communication unit 501 receives a PUCCH from the terminal in, for example, one pSCell selected by the pSCell selection unit 504 out of one or more cells for which the connection is established. The wireless communication unit 501 also transmits data to the terminal in the pSCell or, for example, a serving cell for downlink. The wireless communication unit 501 also receives data from the terminal in the pSCell or in another cell in addition to the pSCell.

The wired communication unit 502 is a functional unit configured to perform wired communication. The wired communication unit 502 establishes wired connection to, for example, the master eNB and performs wired communication. The wired communication unit 502, for example, receives data such as assistance information transmitted from the master eNB. Note that the master eNB and the secondary eNB may be connected not via a wire but via, for example, a radio channel such as a radio entrance. In this case, the wired communication unit 502 may be absent. If a radio section exists halfway through the connection between the master eNB and the secondary eNB, the wired communication unit 502 may exist to establish wired connection to the endpoint of the halfway radio section.

The assistance information acquisition unit 503, for example, acquires assistance information from a signal from the master eNB, which is received via the wired communication unit 502. The acquired assistance information is input to the pSCell selection unit 504. Note that the assistance information acquisition unit 503 may wait for arrival of assistance information from the master eNB. In some cases, the assistance information acquisition unit 503 may specify a terminal and request the master eNB to send assistance information for the terminal.

Based on the input assistance information, the pSCell selection unit 504 selects a pSCell for the terminal corresponding to the assistance information from the plurality of cells included in the SCG. For example, if the assistance information includes information for specifying a portion of cells extracted in the master eNB out of the plurality of cells included in the SCG, the pSCell selection unit 504 selects the pSCell from the extracted portion of cells. If the assistance information shows the levels of radio qualities for an extracted portion of cells, the pSCell selection unit 504 may, for example, select the cell of the highest radio quality as the pSCell. For example, if the number of terminals that select the cell of the highest radio quality as the pSCell is a predetermined number or more, the pSCell selection unit 504 may select the cell of the second highest radio quality as the pSCell.

If the assistance information includes radio quality information such as the value of RSRP or RSRQ in each cell, the pSCell selection unit 504 may select the pSCell from cells for which the value of radio quality is a predetermined value or more. Alternatively, the pSCell selection unit 504 may select the pSCell preferentially from the cell of the highest radio quality included in the assistance information. That is, if the number of terminals that select the cell of the highest radio quality as the pSCell is a predetermined number or more, the pSCell selection unit 504 may select the cell of the second highest radio quality as the pSCell. Note that if the terminal measures the radio qualities of all cells in the SCG, the assistance information may include all the values. Even in this case, the pSCell selection unit 504 may select the pSCell in descending order of the radio quality value or select a cell whose radio quality value is a predetermined value or more as the pSCell.

The information of the cell selected by the pSCell selection unit 504 is notified to the master eNB via, for example, the wired communication unit 502. Note that the pSCell selection unit 504 may control the wireless communication unit 501 according to the selected pSCell.

Upon receiving the information of the selected cell via the wired communication unit 402, the master eNB generates an RRC message and transmits the generated RRC message to the terminal via the wireless communication unit 401 to set the pSCell.

(Procedure of Processing)

Figure 6:
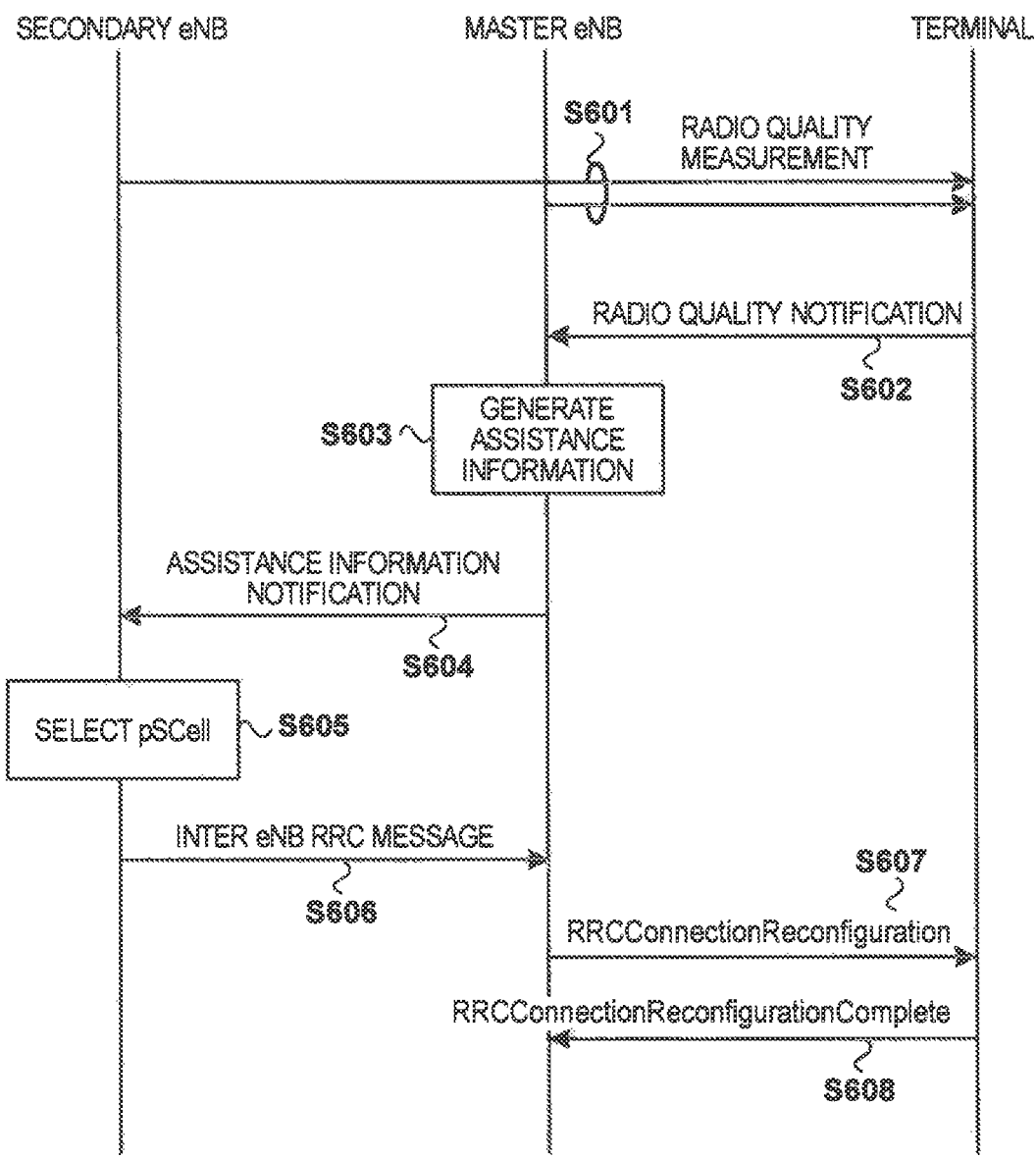
FIG. 6 is a sequence chart showing an example of the procedure of processing.

The procedure of processing executed by each of the master eNB, the secondary eNB, and the terminal in the wireless communication system will be described next. FIG. 6 is a sequence chart showing an example of the procedure of processing according to this embodiment. Note that at the start of the processing shown in FIG. 6, connection settings including which cell out of the plurality of cells included in the MCG should serve as the PCell are completed between the terminal and the master eNB.

In the processing, the terminal first observes radio signals received from the master eNB and the secondary eNB and measures radio qualities (step S601). Note that the radio quality measurement can be performed for one or more cells included in the MCG and one or more cells included in the SCG. Here, the radio quality measurement mainly performed for the cells included in the SCG suffices. This measurement may be done when a predetermined event occurs, for example, when the terminal enters the range of a cell formed by the secondary eNB. Note that the predetermined event is determined by the setting of the wireless communication system, and it is obvious that the event is not limited to the entrance to the range of a cell formed by the secondary eNB. Next, the terminal notifies the master eNB of the radio quality measured for at least the SCG (step S602). Note that the radio quality notification is done in the PCell included in the MCG.

When the radio quality information is acquired, the master eNB then generates assistance information to be used by the secondary eNB to select the pSCell (step S603). At this time, the assistance information includes information for specifying cells concerning, for example, a predetermined number of cells in descending order of radio quality of radio signals received by the terminal. The assistance information may be information for specifying a cell whose radio quality exceeds a predetermined value. If the number of cells each having radio quality more than the predetermined value is a predetermined number or more, the assistance information may be information for specifying a predetermined number of cells selected from them. Information for specifying a cell can be information as described above in several examples. For example, the information can be a global ID for uniquely specifying a unit for baseband processing corresponding to a cell. Note that if the assistance information includes information for specifying a plurality of cells, the assistance information may be generated by including the information for specifying the cells in an order according to the level of radio quality of each cell. The assistance information may be formed by the value of radio quality (RSRP or RSRQ) measured by the terminal for each cell included in the SCG. In this case, for example, if the radio qualities of some cells are not measured, a value equal to that in a case in which the radio quality is the minimum value may be included as the radio quality information for the some cells. The assistance information may include radio quality information for a predetermined number of cells or cells each having radio quality more than a predetermined value. Radio quality information for remaining cells may be not included. After that, the master eNB notifies the secondary eNB of the generated assistance information (step S604).

Using the notified assistance information, the secondary eNB selects a pSCell that is a cell in which the terminal needs to transmit a PUCCH (step S605). The secondary eNB need not always use the notified assistance information, and may use the assistance information or not in some cases. For example, if the reliability of radio quality information used to generate assistance information is low, it may be the case that the secondary eNB does not use the information. In this case, the master eNB may determine the information of the reliability based on, for example, the reception quality of the radio signal used for the radio quality notification in step S602 or the like, and notify the secondary eNB of it. Alternatively, whether the secondary eNB should use the assistance information notified by the master eNB may be determined in accordance with the setting of the secondary eNB.

Note that the pSCell selection may be executed again for a terminal in which the pSCell is already set. That is, based on the radio quality of a radio signal from each cell included in the SCG of each terminal, the above-described selection may be done to set the pSCell again in the terminal. At this time, the secondary eNB may also select a cell (secondary SCell or sSCell) to be used for communication with the terminal.

When the pSCell is selected, the secondary eNB notifies the master eNB of information representing the selected pSCell (step S606). Note that if the sSCell is determined in step S605, the master eNB may also be notified of information representing the sSCell by the notification. This notification can be transmitted as, for example, an inter eNB RRC message.

Upon receiving the notification of information representing the pSCell for a certain terminal, the master eNB transmits an RRC message (for example, RRCConnectionReconfiguration message) to do wireless connection settings of the terminal (step S607). By this message, information representing the pSCell in which the terminal should transmit a PUCCH is notified to the terminal. After that, the terminal does wireless communication settings to transmit a PUCCH in the notified pSCell. According to completion of the wireless communication settings, the terminal transmits, for example, an RRCConnectionReconfigurationComplete message (step S608), and the processing ends.

As described above, in this embodiment, based on radio quality measured by the terminal, the master eNB generates assistance information to be used by the secondary eNB to select a pSCell for the terminal. The secondary eNB receives the assistance information provided by the master eNB and selects a pSCell based on the information. With this method, it is possible to select a pSCell such that the communication quality of a PUCCH transmitted from the terminal to the secondary eNB becomes high.

The present invention is not limited to the above embodiments, and various changes and modifications can be made within the spirit and scope of the present invention. Therefore, to apprise the public of the scope of the present invention, the following claims are made.

The invention claimed is:

1. A terminal apparatus in a wireless communication system in which when connecting the terminal apparatus concurrently to a first base station apparatus and a second base station apparatus, the second base station apparatus selects a frequency band to be used for a control channel being transmitted from the terminal apparatus to the second base station apparatus from a plurality of frequency bands usable by the second base station apparatus, and notifies the terminal apparatus of the selected frequency band, the terminal apparatus comprising:

a processor coupled to a memory, wherein the processor is configured to:

notify, to the first base station, information about radio quality of a signal received from the second base station apparatus for at least one frequency band out of the plurality of frequency bands, wherein the notification of the information causes the first base station to notify, in a case where a number of frequency bands having the radio quality beyond a predetermined value is greater than a predetermined number, the second base station of predetermined information including (1) first information representing the predetermined number of frequency bands extracted from the frequency bands having the radio quality beyond the predetermined value and (2) second information representing frequency bands other than frequency bands represented by the first information in a form such that the first information and the second information are distinguishable, and thereby the notification of the information causes the second base station to select the frequency band to be used for transmission of the control channel; and obtain, from the first base station, information representing the frequency band to be used for transmission of the control channel.

2. The terminal apparatus according to claim 1, wherein the information about radio quality includes reference signal received power and/or reference signal received quality.

3. A terminal apparatus in a wireless communication system in which when connecting the terminal apparatus concurrently to a first base station apparatus and a second base station apparatus, the second base station apparatus selects a frequency band to be used for a control channel being transmitted from the terminal apparatus to the second base station apparatus from a plurality of frequency bands usable by the second base station apparatus, and notifies the terminal apparatus of the selected frequency band, the terminal apparatus comprising:

a processor coupled to a memory, wherein the processor is configured to:

notify, to the first base station, information about radio quality of a signal received from the second base station apparatus for at least one frequency band out of the plurality of frequency bands, wherein the notification of the information causes the first base station to extract a predetermined number of frequency bands in descending order of radio quality, and to notify the second base station of predetermined information including (1) first information representing the extracted predetermined number of frequency bands and (2) second information representing frequency bands other than frequency bands represented by the first information in a form such that the first information and the second information are distinguishable, and thereby the notification of the information causes the second base station to select the frequency band to be used for transmission of the control channel; and obtain, from the first base station, information representing the frequency band to be used for transmission of the control channel.

4. The terminal apparatus according to claim 3, wherein the information about radio quality includes reference signal received power and/or reference signal received quality.

5. A control method of a terminal apparatus in a wireless communication system in which when connecting the terminal apparatus concurrently to a first base station apparatus and a second base station apparatus, the second base station apparatus selects a frequency band to be used for a control channel being transmitted from the terminal apparatus to the second base station apparatus from a plurality of frequency bands usable by the second base station apparatus, and notifies the terminal apparatus of the selected frequency band, the method comprising:

notifying, to the first base station, information about radio quality of a signal received from the second base station apparatus for at least one frequency band out of the plurality of frequency bands, wherein the notification of the information causes the first base station to notify, in a case where a number of frequency bands having the radio quality beyond a predetermined value is greater than a predetermined number, the second base station of predetermined information including (1) first information representing the predetermined number of frequency bands extracted from the frequency bands having the radio quality beyond the predetermined value and (2) second information representing frequency bands other than frequency bands represented by the first information in a form such that the first information and the second information are distinguishable, and thereby the notification of the information causes the second base station to select the frequency band to be used for transmission of the control channel; and obtaining, from the first base station, information representing the frequency band to be used for transmission of the control channel.

6. A control method of a terminal apparatus in a wireless communication system in which when connecting the terminal apparatus concurrently to a first base station apparatus and a second base station apparatus, the second base station apparatus selects a frequency band to be used for a control channel being transmitted from the terminal apparatus to the second base station apparatus from a plurality of frequency bands usable by the second base station apparatus, and notifies the terminal apparatus of the selected frequency band, the terminal apparatus comprising:

a processor coupled to a memory, wherein the processor is configured to:

notify, to the first base station, information about radio quality of a signal received from the second base station apparatus for at least one frequency band out of the plurality of frequency bands, wherein the notification of the information causes the first base station to extract a predetermined number of frequency bands in descending order of radio quality, and to notify the second base station of predetermined information including (1) first information representing the extracted predetermined number of frequency bands and (2) second information representing frequency bands other than frequency bands represented by the first information in a form such that the first information and the second information are distinguishable, and thereby the notification of the information causes the second base station to select the frequency band to be used for transmission of the control channel; and obtain, from the first base station, information representing the frequency band to be used for transmission of the control channel.

* * * * *